United States Patent
Yeh

(10) Patent No.: US 10,248,247 B2
(45) Date of Patent: Apr. 2, 2019

(54) TETHERED STYLUS, TOUCH SENSITIVE ELECTRONIC DEVICE AND SYSTEM AND METHOD THEREOF

(71) Applicant: EGALAX_EMPIA TECHNOLOGY INC., Taipei (TW)

(72) Inventor: Shang-Tai Yeh, Taipei (TW)

(73) Assignee: EGALAX_EMPIA TECHNOLOGY INC., Taipei (TW)

(*) Notice: Subject to any disclaimer, the term of this patent is extended or adjusted under 35 U.S.C. 154(b) by 232 days.

(21) Appl. No.: 15/343,617

(22) Filed: Nov. 4, 2016

(65) Prior Publication Data
US 2017/0131848 A1 May 11, 2017

Related U.S. Application Data

(60) Provisional application No. 62/251,313, filed on Nov. 5, 2015.

(51) Int. Cl.
| | | |
|---|---|---|
| G06F 3/043 | (2006.01) | |
| G06F 3/041 | (2006.01) | |
| G06F 3/0354 | (2013.01) | |
| G06F 3/038 | (2013.01) | |
| G06F 3/044 | (2006.01) | |

(52) U.S. Cl.
CPC .......... *G06F 3/0416* (2013.01); *G06F 3/038* (2013.01); *G06F 3/03545* (2013.01); *G06F 3/044* (2013.01)

(58) Field of Classification Search
CPC .... G06F 3/03545; G06F 3/0354; G06F 3/038; G06F 3/0416; G06F 3/041; G06F 3/044; G06F 3/043
See application file for complete search history.

(56) References Cited

U.S. PATENT DOCUMENTS

| | | | | |
|---|---|---|---|---|
| 8,468,460 | B2* | 6/2013 | Mysliwy | G06F 3/04817 |
| | | | | 715/702 |
| 8,564,553 | B2* | 10/2013 | Yeh | G06F 3/044 |
| | | | | 178/18.06 |
| 9,110,523 | B2* | 8/2015 | Mann | G06F 3/0383 |
| 2010/0170726 | A1 | 7/2010 | Yeh et al. | |
| 2011/0060988 | A1* | 3/2011 | Mysliwy | G06F 3/04817 |
| | | | | 715/702 |
| 2012/0117467 | A1* | 5/2012 | Maloney | G06Q 10/00 |
| | | | | 715/273 |
| 2013/0002606 | A1 | 1/2013 | Mann | |
| 2014/0168178 | A1* | 6/2014 | Maloney | G06Q 10/00 |
| | | | | 345/179 |

FOREIGN PATENT DOCUMENTS

| | | |
|---|---|---|
| TW | 201027405 | 7/2010 |
| TW | 201439826 | 10/2014 |

* cited by examiner

*Primary Examiner* — Vijay Shankar
(74) *Attorney, Agent, or Firm* — WPAT, PC

(57) ABSTRACT

A touch sensitive processing method is applicable to a touch sensitive electronic system comprising a stylus, an audio processor coupling to the stylus, a touch screen, and a touch sensitive processing apparatus coupling to the touch screen. The method comprises having the audio processor driving a tip section of the stylus for emitting electrical signals; and having the touch sensitive processing apparatus receiving sensed electrical signals via the touch screen for determining a position where the tip section is touching or approximating the touch screen.

8 Claims, 9 Drawing Sheets

TETHERED STYLUS, TOUCH SENSITIVE ELECTRONIC DEVICE AND SYSTEM AND METHOD THEREOF

CROSS REFERENCE TO RELATED APPLICATIONS

This application claims priority to U.S. patent application, 62/251,313, filed on Nov. 5, 2015, the disclosure of which is incorporated herein by reference.

BACKGROUND OF THE INVENTION

1. Field of the Invention

The present application relates to the field of stylus, and more particularly, to a low-cost tethered stylus.

2. Description of the Prior Art

Touch panels or screens are one of the main input/output devices of modern electronic apparatuses. And, when a precise input tool is required for the touch panels or screens, a stylus provides an exact position more than a finger does. However, an active stylus is very expensive currently and cannot be commonly configured to every electronic apparatus. Moreover, in the case of using a wireless stylus, the risk of losing should also be considered in addition to the problems of reserve power and power consumption. Therefore, there is a desire for a low-cost stylus with manufacture cost as low as possible so as to make the stylus popularized.

SUMMARY OF THE INVENTION

According to an embodiment of the present application, it can reduce the manufacture cost of a stylus so as to make the stylus popularize. The present application provides a tethered stylus including: a stylus interface; a set of connecting line, coupling to the stylus interface, wherein the set of connecting line at least includes a signal line and a grounded line; a tip section; a capacitor, having two ends respectively coupling to the signal line and the tip section; and a resistor, having two ends respectively coupling to the tip section and the grounded line.

According to an embodiment of the present application, it uses an existing audio interface of a touch sensitive electronic device to couple or connect a stylus so as to reduce the manufacture cost of the stylus and make the stylus popularize. For supporting this function, the touch sensitive electronic device can automatically determine whether the stylus being coupled or connected to the audio interface. The present application provides a touch sensitive electronic device including: an audio signal outputting interface; an audio processor, coupling to the audio signal outputting interface; and a processor, coupling to the audio processor, wherein when the audio processor detects an external object being coupled or connected to the audio signal outputting interface, the processor commands the audio processor to recognize the external object as a tethered stylus or an audio outputting device based on a circuit impedance of the external object.

According to an embodiment of the present application, it uses an existing audio interface of a touch sensitive electronic device to couple or connect a stylus so as to reduce the manufacture cost of the stylus and make the stylus popularize. The present application provides a touch sensitive electronic system including a tethered stylus and a touch sensitive electronic device. The tethered stylus includes: an audio interface; a tip section; and a set of connecting line, coupling with the audio interface and the tip section, wherein the set of connecting line at least includes a signal line and a grounded line. The touch sensitive electronic device includes: an audio signal outputting interface, coupling to the audio interface of the tethered stylus; an audio processor, coupling to the audio signal outputting interface; a touch screen, including multiple first electrodes being parallel with each other and multiple second electrodes being parallel with each other; a touch sensitive processing apparatus, configured to couple to the first electrodes and second electrodes; and a processor, coupling to the audio processor and the touch sensitive processing apparatus, having the audio processor driving the signal line of the tethered stylus through the audio signal outputting interface for the tip section to emit electrical signals, and having the touch sensitive processing apparatus determining a position where the tip section is touching or approximating the touch screen based on receiving electrical signals sensed by the first and second electrodes.

According to an embodiment of the present application, it uses an existing audio interface of a touch sensitive electronic device to couple or connect a stylus so as to reduce the manufacture cost of the stylus and make the stylus popularize. The present application provides a touch sensitive processing method being applicable to a touch sensitive electronic system including a stylus, an audio processor coupling to the stylus, a touch screen, and a touch sensitive processing apparatus coupling to the touch screen. The method including: having the audio processor driving a tip section of the stylus for emitting electrical signals; and having the touch sensitive processing apparatus receiving sensed electrical signals via the touch screen for determining a position where the tip section is touching or approximating the touch screen.

BRIEF DESCRIPTION OF THE DRAWINGS

The present invention can be more fully understood by reading the following detailed description of the preferred embodiments, with reference made to the accompanying drawings, wherein.

DETAILED DESCRIPTION OF THE PREFERRED EMBODIMENTS

Figure 1:
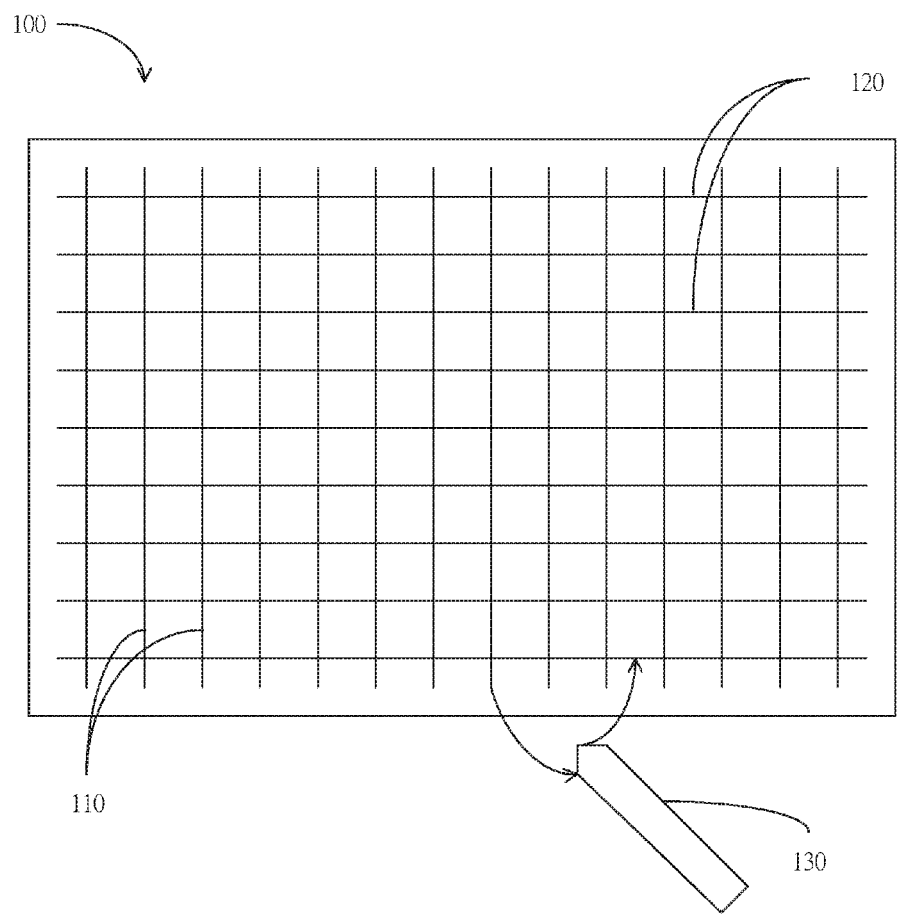
FIG. 1 illustrates a touch sensitive system in accordance with an embodiment of the present application.

Some embodiments of the present invention are described in details below. However, in addition to the descriptions given below, the present invention can be applicable to other embodiments, and the scope of the present invention is not limited by such, rather by the scope of the claims. Moreover, for better understanding and clarity of the description, some components in the drawings may not necessary be drawn to scale, in which some may be exaggerated relative to others, and irrelevant parts are omitted.

One of the features of this application is that adjusting the phase of signal emitted from a stylus to make a touch sensitive device being able to distinguish the stylus from a finger or hand and also being able to identify different states of the stylus.

Referring to FIG. 1, a touch sensitive system 100 in accordance with an embodiment of the present application is illustrated. The touch sensitive system 100 includes a touch sensitive panel or screen (thereinafter, the technical term of touch sensitive screen is used to encompass touch sensitive panel, touch panel, touch sensitive screen, and touch screen.) The touch sensitive screen includes multiple first electrodes 110 and multiple second electrodes 120. Each of the electrodes 110 and 120 of the touch sensitive screen couples or connects to a touch sensitive processing apparatus, and this touch sensitive processing apparatus performs mutual capacitive touch sensing by using the electrodes 110 and 120. According to existing technology, mutual capacitive touch sensing mainly provides a driving signal to the first electrodes 110 in turn and then senses the induced driving signal on each of the second electrodes 120. When a user uses a finger to approach or touch the touch sensitive screen (thereinafter, called approximate event,) the touch sensitive processing apparatus can calculate the position of the approximate event on the touch sensitive screen by sensing the variance (or change) of the induced driving signal. The driving signal is commonly a sinusoidal signal or a sinusoidal signal simulated by digital driving signal.

Figure 2A:
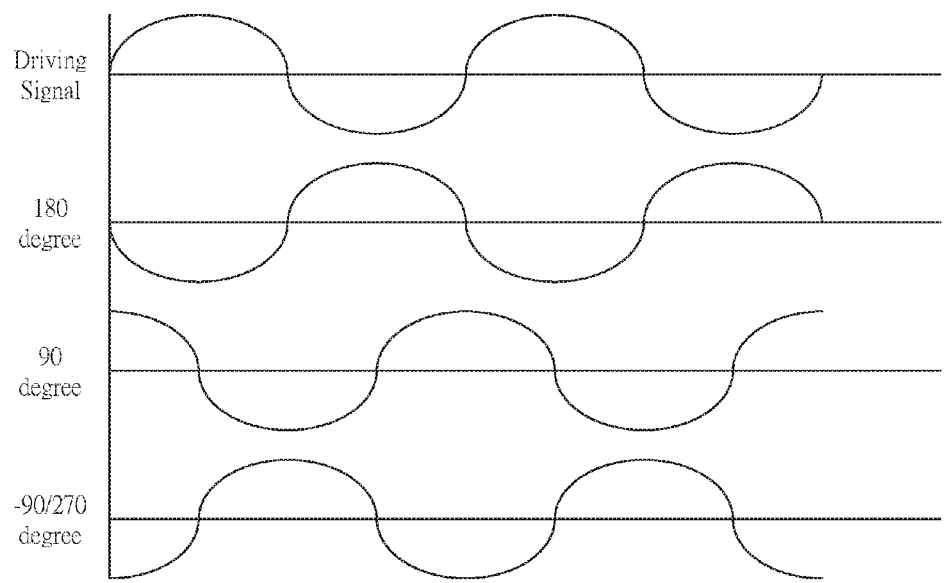
FIG. 2A illustrates a signal emitted from a stylus in accordance with an embodiment of the present application.

Referring to FIG. 2A, a signal emitted from a stylus in accordance with an embodiment of the present application is illustrated. FIG. 2A shows 4 waveforms. The waveform on the top is sinusoidal wave of the driving signal, the second waveform counted down from the top is sinusoidal wave having 180-degree phase difference to the driving signal, the third waveform counted down from the top is sinusoidal wave having 90-degree phase difference to the driving signal, and the last waveform is sinusoidal wave having −90-degree or 270-degree phase difference to the driving signal.

When an approximate event occurs, the induced current generated by the adjacent second electrodes 120 will be taken away by an approximate object so as to cause the induced driving signal to be reduced. In other words, the induced signal becomes weaker in strength. According to existing technology, this physical phenomenon is used to implement the operation principle of a stylus 130. The tip section of the traditional stylus 130 or other antennas may sense the driving signal emitted from the first electrodes 110, for example, such as the uppermost waveform shown in FIG. 2A, and then may adjust or delay the induced signal to half a cycle or 180 degrees to be sent out, for example, such as the second waveform shown in FIG. 2A. The second electrodes 120 being close to the tip section of the stylus 130 will simultaneously induce the driving signal from the first electrodes 110 and the abovementioned second waveform from the stylus 130. Since the waveforms of these two signals are opposite to each other, the induced current generated by the second electrodes 120 will be zero or close to zero. In other words, the signal sensed by the touch sensitive processing apparatus from the second electrodes 120 is like the signal sensed by the touch sensitive processing apparatus when a finger touch, and thus the touch sensitive processing apparatus can calculate the position of the traditional stylus 130.

However, one of the drawbacks of existing technology is that the touch sensitive processing apparatus cannot recognize an approximate object as a finger or a traditional stylus 130. For solving this problem, the present application provides a solution with the feature of making the stylus 130 emitting the third and/or the fourth waveform(s) shown in FIG. 2A to make the touch sensitive processing apparatus being able to recognize the approximate object as the stylus 130 and identify different states of the stylus 130.

In some embodiments, the stylus 130 may be used to sense the driving signal emitted from the first electrodes 110 by its tip section or other antennas, for example, the uppermost waveform in FIG. 2A, and then to adjust or delay the induced signal to a quarter cycle or three quarters cycles to be sent out, that is, to delay 90 degrees or 270 degrees in phase, such as the third waveform or the fourth waveform shown in FIG. 2A.

In some embodiments, the stylus 130 can know the waveform or cycle of the driving signal by other wired or wireless manners. When the tip section or other antennas of the stylus 130 senses the driving signal emitted from the first electrodes 110, the stylus 130 emits the third or the fourth waveform shown in FIG. 2A. In other words, the stylus 130 can synchronize the driving signal by other wired or wireless manners, but it needs to wait until receiving the driving signal emitted form the first electrodes 110, and then emits the waveform such as the third or the fourth waveform shown in FIG. 2A.

Figure 2B:
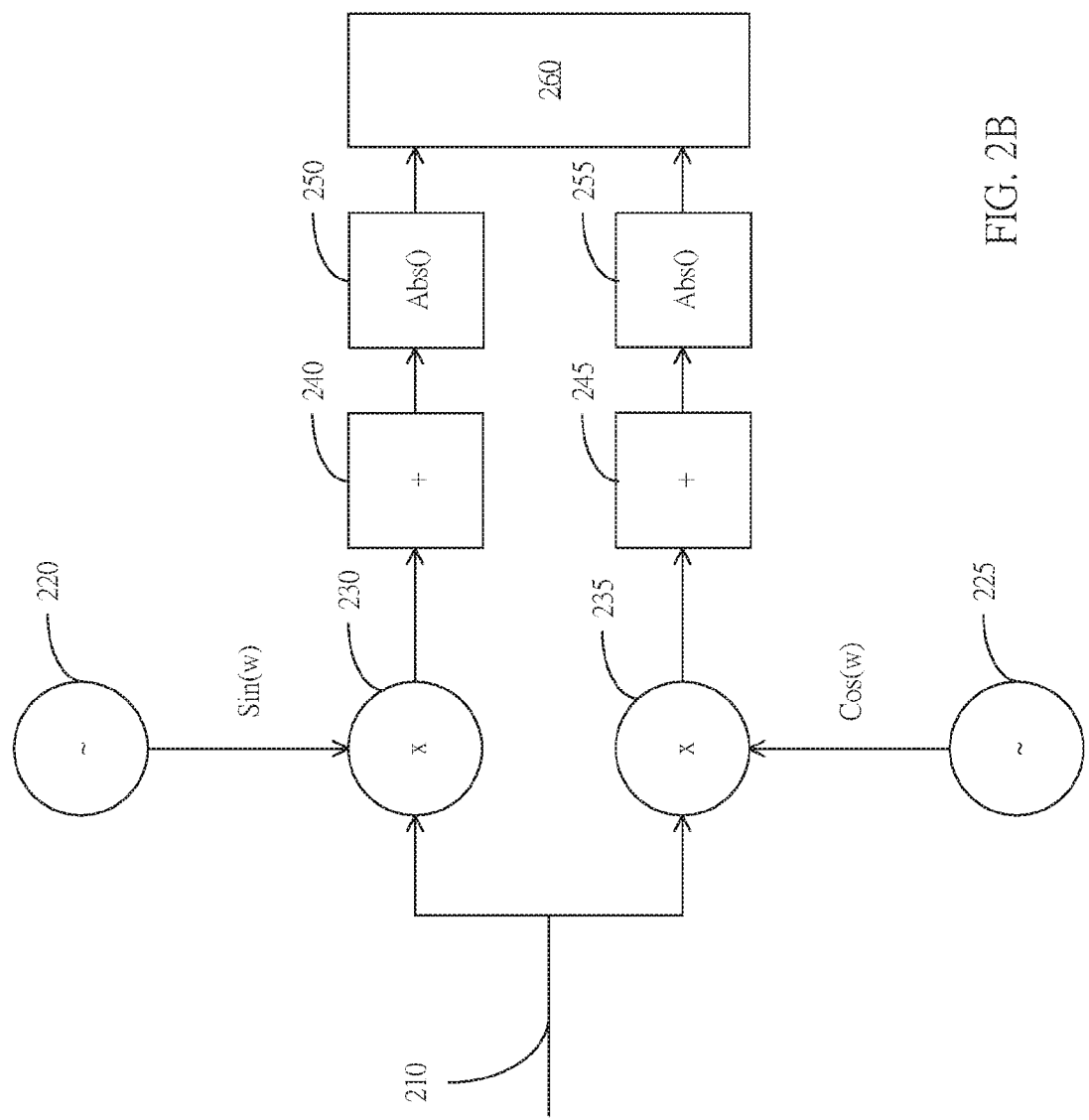
FIG. 2B illustrates an internal architecture of a touch sensitive processing apparatus in accordance with an embodiment of the present application.

Referring to FIG. 2B, an internal architecture for a touch sensitive processing apparatus in accordance with an embodiment of the present application is illustrated. As mentioned above, the touch sensitive processing apparatus couples or connects to each second electrode 120, and the sensed signal will be inputted into the touch sensitive processing apparatus via an interface 210 and then be divided into two paths or channels. The person having ordinary skill in the art can appreciate that the upper part of FIG. 2B depicts in-phase (I) signal processing part and the lower part of FIG. 2B shows quadrature (Q) signal processing part. An in-phase signal source 220 in the in-phase signal processing part may provide the driving signal, and a quadrature signal source 225 in the quadrature signal processing part may provide the signal which delays 90 degrees in phase to the signal of the signal source 220. No matter how to implement, the signals of sinusoidal wave provided by the in-phase signal source 220 and the quadrature signal source 225 are different to 90 degrees in phase.

The output signal of the in-phase signal source 220 and the input signal 210 are relatively processed in an in-phase multiplier 230, and the result is sent to an in-phase adder 240 for accumulating, and the final sum is sent to a logic circuit 260 for determining. Similarly, the output signal of the quadrature signal source 225 and the input signal 210 are relatively processed in a quadrature multiplier 235, and the result is sent to a quadrature adder 245 for accumulating, and the final sum is sent to the logic circuit 260 for determining. In some embodiments, the outputs of the in-phase adder 240 and the quadrature adder 245 may be respectively sent to an in-phase absolute-value calculator 250 and a quadrature absolute-value calculator 255 firstly and then outputting the absolute values to the logic circuit 260.

When the stylus 130 outputs the signal as the third waveform of FIG. 2A, that is, delayed 90 degrees in phase, the in-phase adder 240 outputs the accumulated result being going to be zero, or close to zero, or smaller than an in-phase threshold. Conversely, the quadrature adder 245 outputs the accumulated result being going to be 1, or close to 1, or being difference to 1 with smaller than a quadrature threshold. When the stylus 130 outputs the signal as the second waveform of FIG. 2A, the in-phase absolute-value calculator 250 and the quadrature absolute-value calculator 255 all output 1, or close to 1. The logic circuit 260 may determine the outputs of the in-phase adder 240 and the quadrature adder 245, or the outputs of the in-phase absolute-value calculator 250 and the quadrature absolute-value calculator 255, and it can recognize the output signal of the stylus 130 as the second waveform, the third waveform, or the fourth waveform of FIG. 2A In some embodiments, the stylus 130 may include at least one switch or sensor used to configure or set up the output waveform. When the stylus 130 is configured to output the second waveform, it can be used to the traditional touch sensitive screen. The traditional mutual capacitive touch sensitive processing apparatus regards the stylus 130 in an approximate event as a finger. When the stylus 130 is configured to output the third waveform, it can be applied to the touch sensitive screen provided by the present application, the touch sensitive processing apparatus consider the stylus 130 in an approximate event as a first state of the stylus or a first stylus. When the stylus 130 is configured to output the fourth waveform, it can be applied to the touch sensitive screen provided by the present application, the touch sensitive processing apparatus consider the stylus 130 in an approximate event as a second state of the stylus or a second stylus. The abovementioned first state may represent a normal state, and the abovementioned second state may represent the state of a certain button of the stylus being pressed, for example, such as an eraser button or other buttons.

One of the features of the present application is that using an existing audio signal outputting interface of an electronic device to couple or connect a tethered stylus to make the electronic device being able to control the tethered stylus by the existing audio signal outputting interface to emit electromagnetic signal or electrical signal, and to make the touch sensitive processing apparatus to detect the electromagnetic signal or electrical signal emitted from the stylus for detecting the position and/or state of the tethered stylus.

Figure 3A:
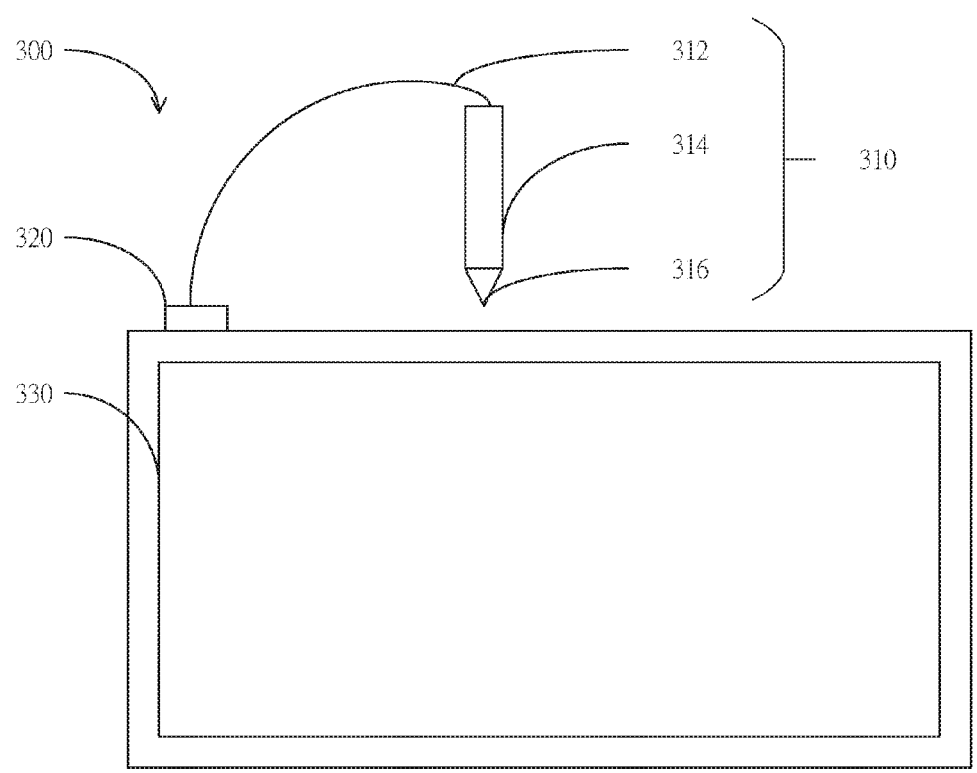
FIGS. 3A and 3B, they are an electronic device in accordance with an embodiment of the present application.
Figure 3B:
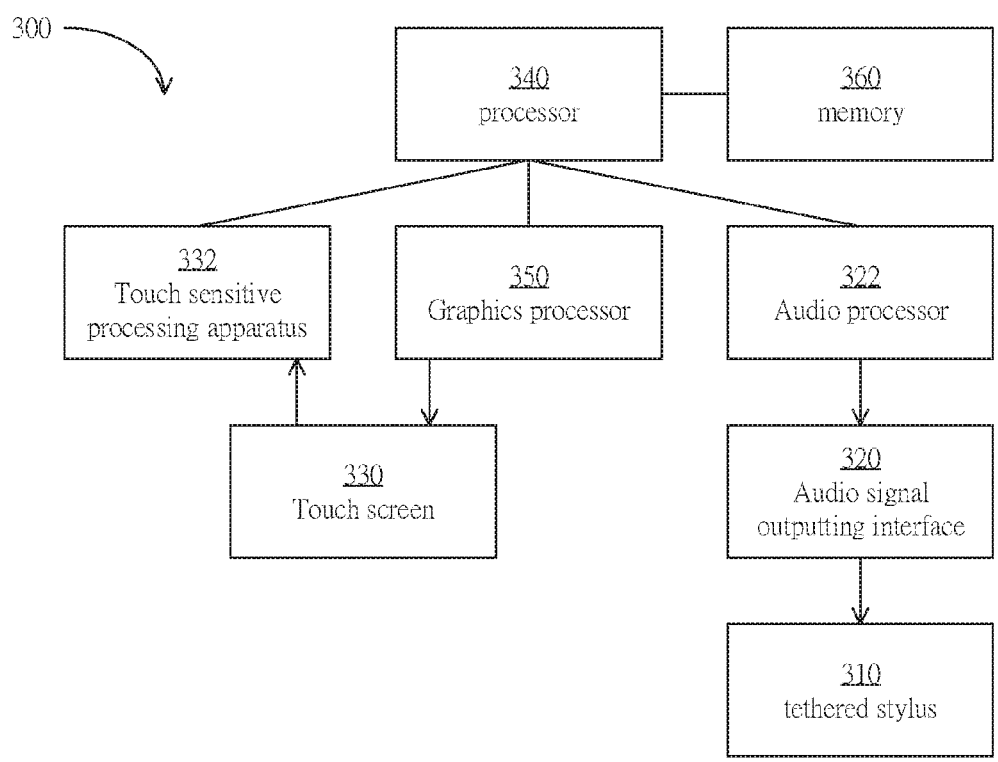

Referring to FIGS. 3A and 3B, they are an electronic device 300 in accordance with an embodiment of the present application. In some embodiments, the electronic device 300 includes a tethered stylus 310 having a (or a set of) connecting line 312, a body 314, and a tip section 316. One end of the connecting line 312 includes an audio signal receiving interface (or audio interface) using for connecting an audio signal outputting interface 320 included by the electronic device 300. The electronic device 300 also includes a touch sensitive screen 330 with the same structure as shown in FIG. 1, including multiple first electrodes 110 and multiple second electrodes 120.

Each of the electrodes 110 and 120 of the touch sensitive screen 330 couples or connects to a touch sensitive processing apparatus 332. In a mutual capacitive touch sensing mode, the touch sensitive processing apparatus 332 performs mutual capacitive touch sensing by each of the electrodes 110 and 120 in order to detect a finger or hand or stylus 130. In a stylus touch sensing mode, the touch sensitive processing apparatus 332 perform stylus sensing by each of the electrodes 110 and 120 in order to detect the signal from the tethered stylus 310. In some embodiments, the touch sensitive processing apparatus 332 may switch the mutual capacitive touch sensing mode and the stylus touch sensing mode so as to detect a finger or hand and tethered stylus 310 in turn.

As shown in FIG. 3B, the electronic device 300 includes a processor 340 configured to couple to a memory 360. The processor 340 could execute the operation system(s), driving program(s), and application program(s) loaded in the memory 360. The processor 340 is configured to couple or connect to and control the touch sensitive processing apparatus 332, a graphics processor 350, and an audio processor 322. The audio processor 322 couples or connects to the audio signal outputting interface 320.

In some embodiments, the processor 340 executes a program, which makes the audio processor 322 detect if the audio signal outputting interface 320 couples to an audio outputting device, such as a speaker or earphone. The program may also make the audio processor 322 detect if the audio signal outputting interface 320 couples to the tethered stylus 310.

In some embodiments, the audio signal outputting interface 320 includes at least two paths or channels, signal path and ground path. When the connecting line 312 of the tethered stylus 310 couples or connects to the audio signal outputting interface 320, the signal path and the ground path get through by the circuit of the tethered stylus 310. Accordingly, the audio processor 322 determines the tethered stylus 310 has been coupled or connected to by detecting the load, voltage dropping, or other electrical signals' change on the abovementioned path. In some embodiments, the audio signal outputting interface 320 may include many paths or channels, such as left channel, right channel, microphone, and ground. The person having ordinary skill in the art can appreciate that using the abovementioned principle can detect these circuits to determine whether the tethered stylus 310 couples or connects to the audio signal outputting interface 320.

When the audio processor 322 couples or connects to the tethered stylus 310 via the audio signal outputting interface 320, the processor 340 executes a program making the audio processor 322 providing signal to the tethered stylus 310. Once the tethered stylus 310 receives the signal, the energy carried by the signal can be released by the tip section 316. The person having ordinary skill in the art can appreciate that the present application is not limited to how the tethered stylus deals with the received signal and what kind of modulation applied to the signal released by the tip section 316. It only requires emitting electrical signal from the tip section 316, the touch sensitive processing apparatus 322 in the stylus sensing mode can detect the signal from the tethered stylus 310 by each of the electrodes 110 and 120 performing stylus sensing. In some embodiments, each of the electrodes 110 and 120 may couple or connect to an integrator and an analog to digital converter, and the electrical signal emitted from the tip section 316 can be detected. According to the strength of the electrical signal received by each of the electrodes 110 and 120, the touch sensitive processing apparatus 332 can calculate the approximate position of the tip section 316.

In some embodiments, a program in accordance with an embodiment of the present application may be executed in the processor 340 to perform the steps as below. In a first mode, making the audio processor 322 emitting signal to the tethered stylus 310 and making the touch sensitive processing apparatus 332 switching to a stylus sensing mode to senses an approximate position of the tethered stylus 310. In a second mode, making the audio processor 322 not emitting signal to the tethered stylus 310 and making the touch sensitive processing apparatus 332 switching to a mutual capacitive sensing mode to senses a finger or hand or the stylus 130. The program may freely switch between the first mode and the second mode, but the switching frequency needs to consider the lead time for the audio processor 322 emitting signal and breaking signal.

Figure 4A:
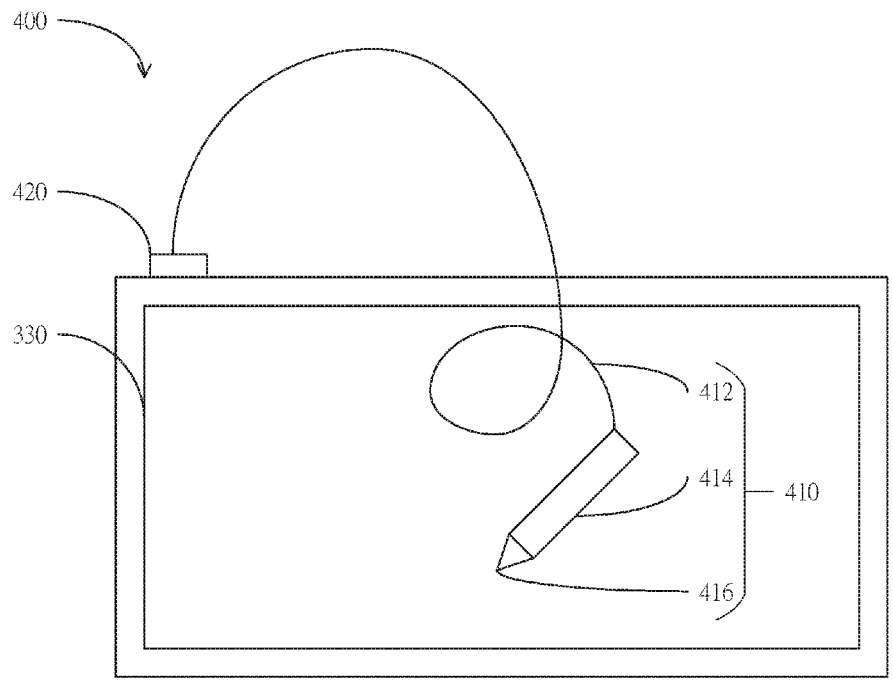
FIGS. 4A and 4C, they are an electronic device in accordance with an embodiment of the present application.
Figure 4B:
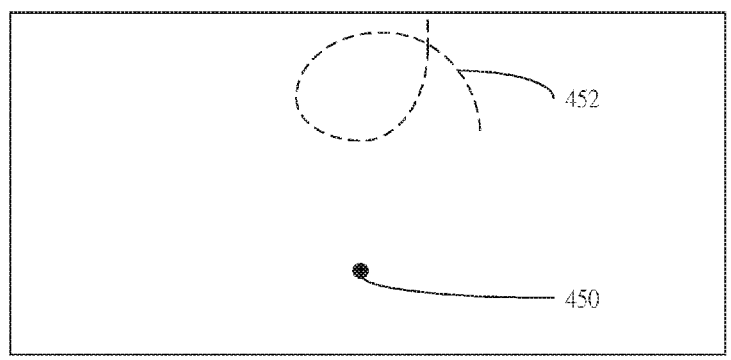
FIG. 4B, it shows the interference with the connecting line 412 in FIG. 4A.
Figure 4C:
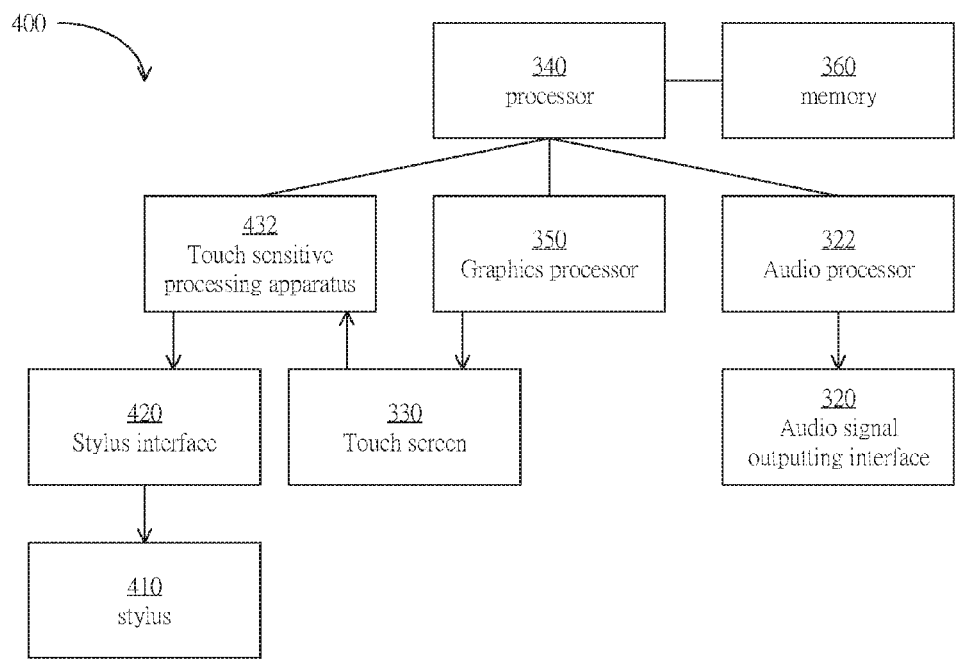

Referring to FIGS. 4A and 4C, they are an embodiment in accordance with the present application. If there is no specific explanation, the elements in this embodiment with the same label as those mentioned above include the above-mentioned features. The electronic device 400 in this embodiment includes a tethered stylus 410 having a (or a set of) connecting line 412, a body 414, and a tip section 416. The connecting line 412 couples or connects to a stylus interface 420, which couples or connects to a touch sensitive processing apparatus 432 but not to couple to the audio signal outputting interface 320.

After the tethered stylus 410 receives the signal from the stylus interface 420, the energy carried by the signal is also released by the tip section 416. Therefore, the touch sensitive processing apparatus 432 can detect the approximate position of the tip section 416 by the induction of each of the electrodes 110 and 120.

Generally speaking, for enhancing signal-to-noise ratio (SNR,) the signal output from the stylus interface 420, commonly, has a higher voltage. For example, it may be 20 volts. However, as shown in FIG. 4A, when the connecting line 412 is placed on the touch sensitive screen 330, the higher voltage on the connecting line 412 also affects each of the electrodes 110 and 120 and causes them to generate unnecessary induction. As shown in FIG. 4B, it shows the interference with the connecting line 412 in FIG. 4A. In addition to the approximate position 450 of the tip section 416, the touch sensitive processing apparatus 432 may also detect the interference line segment 452 from the range of the connecting line 412.

For protecting the touch sensitive screen 330 from the interference with the current carried by the connecting line 412, the tethered stylus 410 may do in the way as mentioned before, that is, it can rotate the driving signal from the connecting line 412 to 90 degrees or −90 degrees. The touch sensitive processing apparatus 432 may be implemented as the circuit or steps of FIG. 2B to make the touch sensitive processing apparatus 432 detecting the stylus 410 to see the approximate position 450 of the tip section 416 only but not to see the interference line segment 452.

Figure 4D:
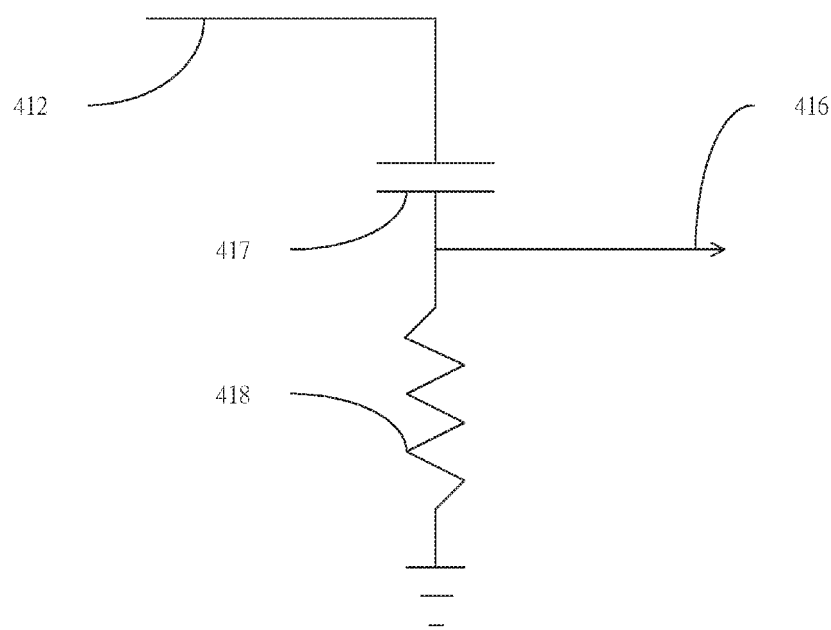
FIG. 4D illustrates an internal circuit of a stylus in accordance with an embodiment of the present application.

However, rotating the driving signal to 90 degrees or −90 degrees, an active circuit, which is expensive and complex, is required in tradition. This requirement to the tethered stylus 410, which only needs simple structure, shatterproof, impact resistance, etc., has no competitiveness. Therefore, in some embodiments, the tethered stylus 410 includes a resistor-capacitor circuit shown in FIG. 4D. In FIG. 4D, the connecting line 412 and the grounded part connect a capacitor 417, the tip of tip section 416, and a resistor 418 in serial. The resistor-capacitor circuit is also used to delay the driving signal, which is sent form the connecting line 412, to a certain phase difference, such as 45 degrees. By doing in this way, the output voltage of the tip section 416 is high enough to keep a better SNR, and in the meantime, the touch sensitive processing apparatus 432 detecting the stylus 410 sees the approximate position 450 of the tip section 416 only but not to see the interference line segment 452 because of the phase difference.

Assuming the signal received by the connecting line 412, the voltage thereof is V, the impedance of the capacitor 417 is Zc, the impedance of the resistor 418 is Zr, the output voltage Vtip from the tip section 416 may be represented as below:

$$V_{tip} = \frac{Zr}{\sqrt{Zr^2 + Zc^2}} \cdot \frac{Zc}{\sqrt{Zr^2 + Zc^2}} \cdot V = \frac{Zr \cdot Zc}{Zr^2 + Zc^2} \cdot V$$

Figure 4E:
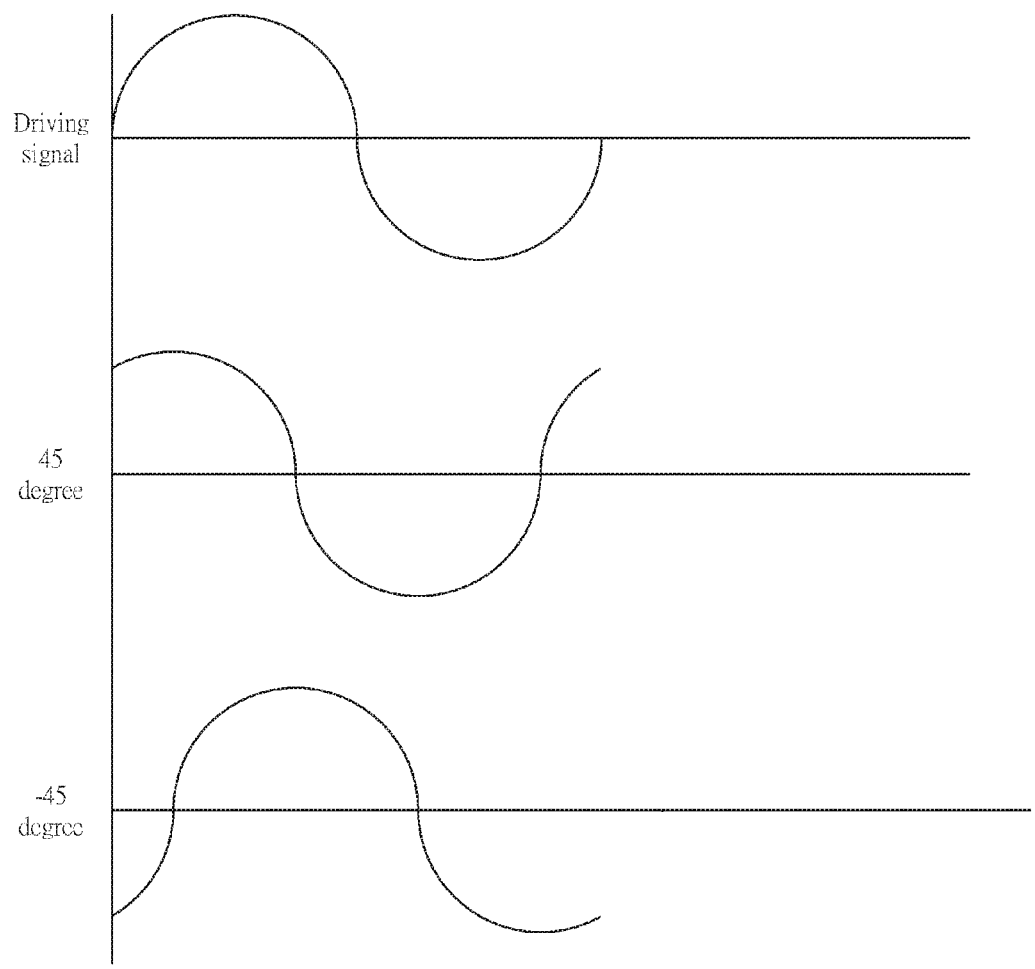
FIG. 4E, it shows a waveform of the driving signal emitted from the tip section 416 when the impedances of the capacitor 417 and the resistor 418 are the same.

In other words, when Zr=Zc, Vtip is biggest and it is 0.5V. This maximum voltage occurs when original signal is delayed to 45 degrees in phase. Referring to FIG. 4E, it shows a waveform of the driving signal emitted from the tip section 416 when the impedances of the capacitor 417 and the resistor 418 are the same.

Since the touch sensitive processing apparatus 432 knows the phase difference set by the tethered stylus 410, and knows the beginning point of cycle of touch sensitive signal, the touch sensitive processing apparatus 432 can use the similar design shown in FIG. 2B to filter out other phase difference signals, so as to get the approximate position 450 of the tip section 416, and will not be interference with the interference line segment 452.

The person having ordinary skill in the art can appreciate that the present application is not limited to the internal design of the tethered stylus 410 as the same as shown in FIG. 4D. The circuit design of the tethered stylus 410 may be changed to use passive components for equivalent resistor-inductor circuit, resistor-inductor-capacitor circuit to shift the received driving signal to a phase difference. In addition, the circuit design of the tethered stylus 410 is not required to make the tip section 416 outputting maximum voltage at 45 degrees' phase angle, it could be other phase angles but needs to satisfy with SNR.

Figure 5:
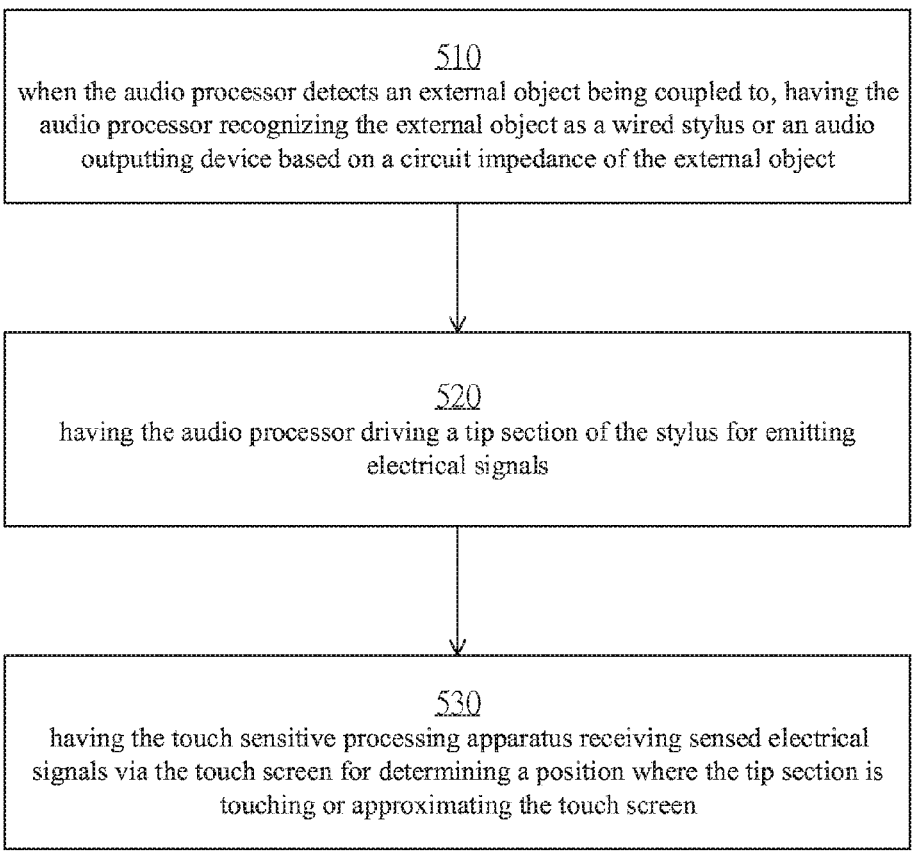
FIG. 5 shows a flowchart of a touch sensitive processing method in accordance with an embodiment of the present application.

Referring to FIG. 5, it shows a flowchart of a touch sensitive processing method in accordance with an embodiment of the present application. The touch sensitive processing method is applicable to a touch sensitive electronic system including a stylus, an audio processor coupling or connecting to the stylus, a touch screen, and a touch sensitive processing apparatus coupling or connecting to the touch screen. As shown in step 510, when the audio processor detects an external object being coupled to, having the audio processor recognizing the external object as a tethered stylus or an audio outputting device based on a circuit impedance of the external object. When a tethered stylus is confirmed to be coupled or connected to, step 520 is then performed.

In step 520, having the audio processor driving a tip section of the stylus for emitting electrical signals, wherein the audio processor may drive the tip section via one of connecting paths or channels as followings: monaural audio signal; binaural left-channel audio signal; binaural right-channel audio signal; and/or microphone signal.

In step 530, having the touch sensitive processing apparatus receiving sensed electrical signals via the touch screen for determining a position where the tip section is touching or approximating the touch screen. Wherein, the touch sensitive processing apparatus may further include an in-phase signal processing part and a quadrature signal processing part respectively used to calculate the strength of the electrical signals sensed by the touch screen, wherein an in-phase signal source in the in-phase signal processing part provides a signal having 45-degree phase difference to the driving signal emitted by the audio processor, and a quadrature signal source in the quadrature signal processing part provides a signal having 90-degree phase difference to the signal of the in-phase signal source.

According to an embodiment, the present application provides a tethered stylus including: a stylus interface; a set of connecting line, coupling to the stylus interface, wherein the set of connecting line at least includes a signal line and a grounded line; a tip section; a capacitor, having two ends respectively coupling to the signal line and the tip section; and a resistor, having two ends respectively coupling to the tip section and the grounded line.

For allowing the audio interface of the tethered stylus to couple or connect to various kinds of audio signal outputting interface, the stylus interface may be an audio interface. Wherein, the signal line may be one of the connecting paths or channels of the audio interface as followings: monaural audio signal; binaural left-channel audio signal; binaural right-channel audio signal; and/or microphone signal.

For achieving delaying electrical signal outputted by the tip section to 45-degree phase difference, the impedance of the capacitor is equal to the impedance of the resistor.

According to an embodiment, the present application provides a touch sensitive electronic device including: an audio signal outputting interface; an audio processor, coupling to the audio signal outputting interface; and a processor, coupling to the audio processor, wherein when the audio processor detects an external object being coupled to the audio signal outputting interface, the processor commands the audio processor to recognize the external object as a tethered stylus or an audio outputting device based on a circuit impedance of the external object.

According to an embodiment, the present application provides a touch sensitive electronic system including a tethered stylus and a touch sensitive electronic device. The tethered stylus includes: an audio interface; a tip section; and a set of connecting line, coupling with the audio interface and the tip section, wherein the set of connecting line at least includes a signal line and a grounded line. The touch sensitive electronic device includes: an audio signal outputting interface, coupling to the audio interface of the tethered stylus; an audio processor, coupling to the audio signal outputting interface; a touch screen, including multiple first electrodes being parallel with each other and multiple second electrodes being parallel with each other; a touch sensitive processing apparatus, configured to couple to the first and second electrodes; and a processor, coupling to the audio processor and the touch sensitive processing apparatus, having the audio processor driving the signal line of the tethered stylus via the audio signal outputting interface for the tip section to emit electrical signals, and having the touch sensitive processing apparatus determining a position where the tip section is touching or approximating the touch screen based on receiving electrical signals sensed by the first and second electrodes.

For allowing the audio interface of the tethered stylus to couple or connect to various kinds of audio signal outputting interface, the signal line may be one of the connecting paths or channels of the audio interface and/or the audio signal outputting interface as followings: monaural audio signal; binaural left-channel audio signal; binaural right-channel audio signal; and/or microphone signal.

For achieving delaying electrical signal outputted by the tip section to 45-degree phase difference, the tethered stylus further includes a capacitor having two ends respectively coupling or connecting to the signal line and the tip section; and a resistor having two ends respectively coupling or connecting to the tip section and the grounded line, wherein the impedance of the capacitor is equal to the impedance of the resistor. For protecting the touch screen from the interference with the connecting line placed on the touch screen, the touch sensitive processing apparatus includes an in-phase signal processing part and a quadrature signal processing part respectively used to calculate the strength of the electrical signals sensed by the first and second electrodes, wherein an in-phase signal source in the in-phase signal processing part provides a signal having 45-degree phase difference to the driving signal emitted by the audio processor, and a quadrature signal source in the quadrature signal processing part provides a signal having 90-degree phase difference to the signal of the in-phase signal source.

For determining whether the tethered stylus being coupled or connected to the audio signal outputting interface, when the audio processor detects an external object being coupled or connected to the audio signal outputting interface, the processor commands the audio processor to recognize the external object as a tethered stylus or an audio outputting device based on a circuit impedance of the external object.

According to an embodiment, the present application provides a touch sensitive processing method being applicable to a touch sensitive electronic system including a stylus, an audio processor coupling to the stylus, a touch screen, and a touch sensitive processing apparatus coupling to the touch screen. The method including: having the audio processor driving a tip section of the stylus for emitting electrical signals; and having the touch sensitive processing apparatus receiving sensed electrical signals via the touch screen for determining a position where the tip section is touching or approximating the touch screen.

For detecting an external object coupling or connecting to the audio processor if a tethered stylus, having the audio processor recognizing the external object as a tethered stylus or an audio outputting device based on a circuit impedance of the external object.

For allowing the audio interface of the tethered stylus to couple or connect to various kinds of audio signal outputting interface, the audio processor drives the tip section via one of connecting paths or channels as followings: monaural audio signal; binaural left-channel audio signal; binaural right-channel audio signal; and/or microphone signal.

For protecting the touch screen from the interference with the connecting line placed on the touch screen, the touch sensitive processing apparatus further includes an in-phase signal processing part and a quadrature signal processing part respectively used to calculate the strength of the electrical signals sensed by the touch screen, wherein an in-phase signal source in the in-phase signal processing part provides a signal having 45-degree phase difference to the driving signal emitted by the audio processor, and a quadrature signal source in the quadrature signal processing part provides a signal having 90-degree phase difference to the signal of the in-phase signal source.

The above embodiments are only used to illustrate the principles of the present invention, and they should not be construed as to limit the present invention in any way. The above embodiments can be modified by those with ordinary skill in the art without departing from the scope of the present invention as defined in the following appended claims.

What is claimed is:
1. A touch sensitive electronic system, comprising:
a tethered stylus, comprising:
an audio interface;
a tip section; and a set of connecting line, coupling with the audio interface and the tip section, wherein the set of connecting line at least comprises a signal line and a grounded line; and a touch sensitive electronic device, comprising:
an audio signal outputting interface, coupling to the audio interface of the tethered stylus;
an audio processor, coupling to the audio signal outputting interface;
a touch screen, comprising a plurality of first electrodes being parallel with each other and a plurality of second electrodes being parallel with each other;
a touch sensitive processing apparatus, configured to couple to the plurality of first and second electrodes; and
a processor, coupling to the audio processor and the touch sensitive processing apparatus, having the audio processor driving the signal line of the tethered stylus via the audio signal outputting interface for the tip section to emit electrical signals, and having the touch sensitive processing apparatus determining a position where the tip section is touching or approximating the touch screen based on receiving electrical signals sensed by the plurality of first and second electrodes,
wherein the touch sensitive processing apparatus further comprises an in-phase signal processing part and a quadrature signal processing part respectively used to calculate the strength of the electrical signals sensed by the plurality of first and second electrodes, wherein an in-phase signal source in the in-phase signal processing part provides a signal having 45-degree phase difference to the driving signal emitted by the audio processor, and a quadrature signal source in the quadrature signal processing part provides a signal having 90-degree phase difference to the signal of the in-phase signal source.

2. The touch sensitive electronic system of claim 1, wherein the signal line includes one of the connecting paths of the audio interface and/or the audio signal outputting interface as followings: monaural audio signal; binaural left-channel audio signal; binaural right-channel audio signal; and/or microphone signal.

3. The touch sensitive electronic system of claim 1, wherein the tethered stylus further comprises a capacitor having two ends respectively coupling to the signal line and the tip section; and a resistor having two ends respectively coupling to the tip section and the grounded line, wherein an impedance of the capacitor is equal to an impedance of the resistor.

4. The touch sensitive electronic system of claim 1, wherein when the audio processor detects an external object being coupled to the audio signal outputting interface, the processor commands the audio processor to recognize the external object as a tethered stylus or an audio outputting device based on a circuit impedance of the external object.

5. A touch sensitive electronic device, comprising:
an audio signal outputting interface;
an audio processor, coupling to the audio signal outputting interface; and
a processor, coupling to the audio processor, wherein when the audio processor detects an external object being coupled to the audio signal outputting interface, the processor commands the audio processor to recognize the external object as a tethered stylus or an audio outputting device based on a circuit impedance of the external object.

6. A touch sensitive processing method being applicable to a touch sensitive electronic system comprising a stylus, an audio processor coupling to the stylus, a touch screen, and a touch sensitive processing apparatus coupling to the touch screen, the method comprising:
having the audio processor driving a tip section of the stylus for emitting electrical signals; and
having the touch sensitive processing apparatus receiving sensed electrical signals via the touch screen for determining a position where the tip section is touching or approximating the touch screen, wherein the touch sensitive processing apparatus further comprises an in-phase signal processing part and a quadrature signal processing part respectively used to calculate the strength of the electrical signals sensed by the touch screen, wherein an in-phase signal source in the in-phase signal processing part provides a signal having 45-degree phase difference to the driving signal emitted by the audio processor, and a quadrature signal source in the quadrature signal processing part provides a signal having 90-degree phase difference to the signal of the in-phase signal source.

7. The touch sensitive processing method of claim 6, wherein when the audio processor detects an external object being coupled to, having the audio processor recognizing the external object as a tethered stylus or an audio outputting device based on a circuit impedance of the external object.

8. The touch sensitive processing method of claim 6, wherein the audio processor drives the tip section via one of connecting paths as followings: monaural audio signal; binaural left-channel audio signal; binaural right-channel audio signal; and/or microphone signal.

* * * * *